United States Patent Office 2,880,121
Patented Mar. 31, 1959

2,880,121

POLYPROPYLENE PROCESS

William E. Thompson, Wallingford, Pa., assignor to Sun Oil Company, Philadelphia, Pa., a corporation of New Jersey No Drawing. Application March 15, 1957
Serial No. 646,208

14 Claims. (Cl. 134—2)

This invention relates to a process for cleaning reactors employed for the polymerization of olefins, and more particularly relates to the removal of polypropylene from apparatus employed in the preparation thereof.

Propylene can be polymerized to relatively high molecular weight solid polymers by contacting proyplene with a dispersion of titanium trichloride and an activator such as aluminum triethyl maintained in an inert, liquid reaction medium. This polymerization process is usually performed as a batch operation, but continuous operation can be used. In batch operation, the reactor is essentially a vessel provided with a mechanical stirrer and means for introducing the reaction mixture components. In continuous operation, an elongated, cylindrical vessel which may contain scraping blades designed to prevent adherence of polymer to the vessel walls can be employed. Generally such processes produce solid polymers having molecular weights of above about 5,000 and generally within the range of from about 50,000 to 300,000, and such polymers are herein designated "polypropylene." A proportion of the solid products obtained with the mentioned catalyst appears crystalline, i.e., exhibits a crystalline structure by X-ray analysis. The crystalline polymer is substantially insoluble in the usual hydrocarbon solvents, such as the paraffins, including for example, the pentanes, hexanes, octanes, decanes, and the like, and is also insoluble in oxygen-containing organic solvents such as aldehydes and ketones. Since the crystalline form of the polymer has especially desirable properties, it is preferred to operate the process so that a large proportion of the polymer is crystalline. However, the polymer product is frequently produced in a form such that the apparatus used for polymerization becomes fouled therewith. For example, the polymer may be produced in stringy, fibrous form and, in batch operation, the stirrer becomes entangled in a mass thereof. This polymer adheres tenaciously to the stirrer or comparable equipment, and removal thereof is difficult. The adhering polymer cannot be dissolved in the usual solvents and scrapping is difficult and time consuming. The same difficulty is observed in continuous operation wherein stirrers, scrapers and other pieces of equipment such as valves and the like are fouled.

An object of the present invention is to provide a process for cleaning polypropylene from polymerization apparatus. A further object is to provide a process for the removal of polypropylene adhering to moving parts of polymerization apparatus. Other objects and their achievement in accordance with the present invention will be apparent hereinafter.

In United States patent application, Serial Number 638,222, filed February 5, 1957, a process for converting crystalline polypropylene to an oxidized product which is soluble in common solvents such as aldehydes and ketones is described. According to this application, by heating crystalline polypropylene to a temperature above its melting point in an atmosphere containing oxygen, and maintaining such conditions for an appropriate period of time, a limited quantity of oxygen combines with the polypropylene to form a new composition of matter which is relatively soluble in hydrocarbons and oxygen-containing solvents such as aldehydes and ketones.

It has now been found that polypropylene adhering to apparatus, especially the apparatus used in the preparation thereof, can be removed by heating the adhering polypropylene to an elevated temperature in contact with oxygen, introducing a hot solvent into the apparatus to dissolve the polypropylene, and removing the solution from the apparatus.

In accordance with the invention, polypropylene contained in or adhered to polymerization apparatus is contacted with oxygen at an elevated temperature. Preferably the temperature is above the melting point of the polymer. The contacting with oxygen can be performed in liquid or gas phase. The contacting is continued until the polymer is soluble in a solvent, as herein described. The oxygen-containing polypropylene is dissolved in the solvent and the solution removed from the apparatus by any convenient means.

In carrying out the polymerization of polypropylene, a solid catalyst maintained as a dispersion in an inert, liquid diluent such as n-heptane or isooctane is used. The solid catalyst is preferably a halide or a metal such as zirconium, chromium, vanadium, molybdenum, or titanium wherein the metal is in a valence state other than its highest valence state. A lower halide of titanium such as titanium trichloride or titanium dichloride is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 32°F. to 302°F. are suitable. Atmospheric pressure is preferably used although elevated pressures can be used to advantage in that the polymerization reaction proceeds at a faster rate at such elevated pressures, say up to about 10,000 p.s.i.g. (pounds per square inch gauge). Polypropylene is recovered from the reaction system effluent by draining the inert, liquid reaction medium and deactivating and removing the catalyst by contacting the mixture of polypropylene and catalyst with water, alcohol or an aqueous solution of an inorganic acid, such as nitric acid, with vigorous agitation. Preferably such agitation provides for comminuting the catalyst during the contacting with the catalyst deactivating liquid. The polymer is then repeatedly washed to remove at least a major proportion of the residual inorganic material from the catalyst, and is then dried.

In performing the polymerization process, the apparatus employed may become fouled with at least a portion of the polymer product. It appears that the polymer in some instances is formed, for example, in a fibrous, or stringy, form which adheres to moving parts such as stirrers and the like. Means heretofore used for cleaning the apparatus, such as mechanical scraping, is difficult and unsatisfactory. The present invention provides for cleaning such apparatus.

In an embodiment of the present invention, polypropylene adhering to parts of a reactor is heated to an elevated temperature, preferably to a temperature of from about 338° F. to 464° F. The polymer, which at such elevated temperatures is too viscous to flow easily, is maintained at the elevated temperature in contact with an atmosphere containing oxygen in gas phase until the polymer contains at least 0.2%, and preferably from 0.5% to 4% by weight, of combined oxygen. The oxygen content of the environment contacting the polymer can vary from about 2% to about 40% with good results, An atmosphere of air is preferably used. Mixtures of oxygen and an inert gas such as nitrogen provide for convenient regulation of the oxygen content. Also, subatmospheric pressures can be used to regulate the oxygen content. Mild agitation of the molten polypropylene such as by stirring, if possible, is advantageously maintained during the contact with oxygen, but such agitation is not essential. After the oxidation has been performed, a solvent is introduced into the apparatus, preferably at an elevated temperature, and is contacted with the oxygen-containing polypropylene.

The oxygen-containing polypropylene is readily soluble in the solvent, usually at least to the extent of 20% by weight. After the polypropylene is dissolved, the solution is removed from the apparatus by any convenient means such as by draining, lifting, pouring or the like.

In another embodiment of the invention, polypropylene remaining in a reactor is removed by introducing a solvent, as hereinafter described, preferably having a boiling point above the melting point of the polypropylene into the reactor so that the adhering polypropylene is immersed therein. Oxygen is introduced into the solvent while maintaining the temperature above the melting point of the polypropylene. If desired, a lower temperature can be used, say as low as 200° F., but in this instance the oxidation step is considerably longer than when higher temperatures are used. Oxygen is introduced into the solvent by any convenient means, such as by bubbling air, oxygen or the like into the solvent. Oxidizing agents such as peroxides can also be employed with good results. As the oxidation proceeds, the polymer becomes soluble in the solvent and is gradually dissolved therein. When the dissolution is complete, the solvent containing dissolved polypropylene is removed from the reactor.

Solvents which can be used in the process of the invention have a boiling point above 200° F. Aromatic hydrocarbons such as toluene, the xylenes and the like give good results. Paraffins and cycloparaffins, n-heptane, n-octane, n-nonane, n-decane and homologues and isomers thereof give good results as do tetrahydronaphthalene, decahydronaphthalene and homologues thereof. Oxygen-containing solvents including aldehydes, ketones, alcohols and ethers which boil above 200° F. give good results. For example, capric aldehyde, caprylic aldehyde, ethylene glycol, dimethyl-diethylene glycol, acetophenone, glycerol, cetyl alcohol, cresol, phorone, mesityl oxide, and the like give good results.

The following examples illustrates the process of the invention:

*Example 1*

Into an autoclave fitted with a horseshoe stirrer were introduced 2,870 parts of n-heptane containing 4.95 parts of titanium trichloride particles as a dispersion, and 2.2 parts of aluminum triethyl. Propylene was then introduced into the autoclave to a pressure of 200 p.s.i.g. with the temperature adjusted to 195° F. The pressure was maintained at substantially 200 p.s.i.g. for 2.1 hours by periodic addition of propylene. Care was taken to substantially exclude moisture and oxygen from the reaction, since they have an adverse effect on the catalyst. The reaction was then stopped, and n-heptane containing a portion of the polypropylene was removed from the autoclave. 605 parts of white, solid polypropylene having a molecular weight of 270,000 were produced. A portion of the polypropylene product appeared as a fibrous, sinewy product firmly adhered to the stirrer and stirrer shaft.

Removal of this polymer product from the shaft by scraping was used, and the removal was difficult and unsatisfactory. Instead of using mechanical means, the stirrer and adhered polymer are heated to a temperature of 350° F. in contact with air for 4 hours, and are then contacted with about 4 parts of capric aldehyde per part of polymer at a temperature of 300° F. The polymer is rapidly dissolved and the polymer removed from the apparatus as a solution in the aldehyde.

*Example 2*

Polypropylene is prepared as described in Example 1. On draining n-heptane from the autoclave after the polymerization reaction, a portion of the polymer is removed therewith. However, a substantial quantity remains adhered to the stirrer and stirrer shaft. About 6 parts of decahydronaphthalene per part of adhering polymer are introduced into the autoclave, a total of about 560 parts of decahydronaphthalene being used, which quantity is sufficient to cover the polypropylene adhered to the apparatus. The decahydronaphthalene is then heated to a temperature of about 340° F. and air is bubbled therethrough at atmospheric pressure. After about 5 hours, the polypropylene has completely dissolved in the decahydronaphthalene and the solution is removed from the autoclave by draining. The apparatus is then ready for further polymerization.

In the process of the invention, after the solution of polypropylene in the solvent used is removed from the apparatus, the polypropylene containing a minor quantity of oxygen, say from about 0.2% to 4% by weight oxygen, can be recovered from the solution by any convenient means, such as by flash evaporation of the solvent, cooling or the like. The recovered oxygen-containing polymer is a valuable product and can be used as described in copending application Serial Number 638,222.

The invention claimed is:

1. Process for removing solid polypropylene adhering to apparatus which comprises contacting the adhering polypropylene with oxygen at an elevated temperature, dissolving the so-treated polypropylene, in an organic solvent having a boiling point above about 200° F., and removing the resulting solution from the apparatus.

2. Process for removing solid polypropylene adhering to apparatus which comprises contacting the adhering polypropylene with oxygen at an elevated temperature of from about 338° F. to 464° F. for a time sufficient to combine from about 0.2% to 4% by weight of oxygen with the polypropylene, contacting the oxygen-containing polypropylene with a hot organic solvent having a boiling point above about 200° F., and removing a solution of the oxygen-containing polypropylene in said solvent from the apparatus.

3. Process for removing solid polypropylene adhering to apparatus which comprises contacting, at an elevated temperature, the adhering polypropylene with oxygen in the gas phase for a time sufficient to combine from about 0.2% to 4% by weight of oxygen with the polypropylene, contacting the oxygen-containing polypropylene with a hot organic solvent having a boiling point above about 200° F., and removing a solution of the oxygen-containing polypropylene in said solvent from the apparatus.

4. Process according to claim 3 wherein said solvent is decahydronaphthalene.

5. Process according to claim 3 wherein said solvent is tetrahydronaphthalene.

6. Process according to claim 3 wherein said solvent is an oxygen-containing solvent boiling above about 200° F.

7. Process according to claim 3 wherein said solvent is capric aldehyde.

8. Process according to claim 3 wherein said solvent is ethylene glycol.

9. Process for removing solid polypropylene adhering to apparatus which comprises immersing the adhering polypropylene in an organic solvent having a boiling point above about 200° F., maintaining the temperature of the solvent above about 200° F. while introducing oxygen therein, whereby oxygen-containing polypropylene is formed and is dissolved by said solvent, and removing the resulting solution from the apparatus.

10. Process according to claim 9 wherein said solvent is decahydronaphthalene.

11. Process according to claim 9 wherein said solvent is tetrahydronaphthalene.

12. Process according to claim 9 wherein said solvent is an oxygen-containing solvent boiling above about 200° F.

13. Process according to claim 9 wherein said solvent is capric aldehyde.

14. Process according to claim 9 wherein said solvent is ethylene glycol.

References Cited in the file of this patent

UNITED STATES PATENTS

| | | |
|---|---|---|
| 2,534,013 | Garrett | Dec. 12, 1950 |
| 2,563,085 | Utsinger | Aug. 7, 1951 |
| 2,679,465 | McKay | May 25, 1954 |